US012745285B2

(12) United States Patent
Huang

(10) Patent No.: US 12,745,285 B2
(45) Date of Patent: Sep. 22, 2026

(54) METHOD AND AP FOR SELECTIVE SUBCHANNEL TRANSMISSION OPERATION IN WIRELESS LOCAL AREA NETWORKS

(71) Applicant: GUANGDONG OPPO MOBILE TELECOMMUNICATIONS CORP., LTD., Dongguan (CN)

(72) Inventor: Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 316 days.

(21) Appl. No.: 18/493,312

(22) Filed: Oct. 24, 2023

(65) Prior Publication Data

US 2024/0057163 A1 Feb. 15, 2024

Related U.S. Application Data

(63) Continuation of application No. PCT/CN2022/088591, filed on Apr. 22, 2022.

(30) Foreign Application Priority Data

Apr. 29, 2021 (SG) .......................... 10202104442R

(51) Int. Cl.
*H04W 74/0816* (2024.01)
*H04L 1/00* (2006.01)
*H04W 84/12* (2009.01)

(52) U.S. Cl.
CPC ....... *H04W 74/0816* (2013.01); *H04L 1/0069* (2013.01); *H04W 84/12* (2013.01)

(58) Field of Classification Search
None
See application file for complete search history.

(56) References Cited

U.S. PATENT DOCUMENTS

2016/0135199 A1 5/2016 Wang et al.
2019/0141631 A1* 5/2019 Patil .................. H04W 52/0229
(Continued)

FOREIGN PATENT DOCUMENTS

EP 3493629 B1 7/2023
TW 201927062 A 7/2019
WO 2019174557 A1 9/2019

OTHER PUBLICATIONS

European Search Report, European Patent Application No. 22794787.6, mailed Oct. 4, 2024, 8 pages.
(Continued)

*Primary Examiner* — Derrick W Ferris
(74) *Attorney, Agent, or Firm* — Ladas & Parry LLP

(57) ABSTRACT

Embodiments of the present application provide a method and an AP for selective subchannel transmission (SST) operation in a WLAN. The method includes: setting, by an access point AP, a target wake time (TWT) element of a TWT response to indicate a subchannel provided to a station (STA) as a temporary channel during a TWT service period (SP), wherein whether the subchannel is in a first channel or a second channel depends on a channel puncturing pattern of a basic service set (BSS) with which the STA is associated, and sending, by the AP, the TWT response to the STA to establish an individual TWT agreement between the AP and the STA.

19 Claims, 7 Drawing Sheets

(56) References Cited

U.S. PATENT DOCUMENTS

| | | | | |
|---|---|---|---|---|
| 2019/0174410 | A1* | 6/2019 | Seok | H04W 72/04 |
| 2019/0215884 | A1* | 7/2019 | Patil | H04W 74/004 |
| 2020/0015219 | A1* | 1/2020 | Asterjadhi | H04W 72/51 |
| 2020/0288439 | A1 | 9/2020 | Seok et al. | |
| 2021/0266890 | A1* | 8/2021 | Chu | H04W 72/51 |
| 2024/0080808 | A1* | 3/2024 | Lim | H04W 74/002 |

OTHER PUBLICATIONS

IEEE P802.11ax™/D8.0 Draft Standard for Information technology—Telecommunications and information exchange between systems Local and metropolitan area networks—Specific requirements Part 11: Wireless LAN Medium Access Control(MAC) and Physical Layer (PHY) Specifications Amendment 1: Enhancements for High Efficiency WLAN Oct. 2020(820 pages).

IEEE 802.11-20/0736r2 EHT SST Operation mailed Jul. 20, 2020(9 pages).

IEEE 802.11-20/0095r6 PHY-related agreements for SST mailed Mar. 2, 2021(12 pages).

International Search Report, International Application No. PCT/CN2022/088591, mailed Jun. 28, 2022 (9 pages).

* cited by examiner

| Order | Information |
|---|---|
| 1 | Category |
| 2 | Unprotected S1G Action |
| 3 | Dialog Token |
| 4 | One or two TWT elements |

| | Element ID (216) | Length | Control | TWT Parameter Information |
|---|---|---|---|---|
| Octets: | 1 | 1 | 1 | Variable |

METHOD AND AP FOR SELECTIVE SUBCHANNEL TRANSMISSION OPERATION IN WIRELESS LOCAL AREA NETWORKS

CROSS REFERENCE

The present application is a continuation-application of International (PCT) Patent Application No. PCT/CN2022/088591, filed on Apr. 22, 2022, which claims foreign priority of Singapore Patent Application No. 10202104442R, filed on Apr. 29, 2021, the entire contents of which are hereby incorporated by reference in its entirety.

FIELD OF INVENTION

The invention relates to resource allocation in an extremely high throughput (EHT) physical layer protocol data unit (PPDU) with large bandwidth in wireless communications, and more particularly to a method and an AP for selective subchannel transmission (SST) operation in a wireless local area network (WLAN).

BACKGROUND

Institute of Electrical and Electronics Engineers (IEEE) 802.11 TGbe is developing a new IEEE 802.11 amendment which defines EHT physical layer (PHY) and medium access control (MAC) layers capable of supporting a maximum throughput of at least 30 Gbps. To this end, it has been proposed to increase maximum channel bandwidth to 320 MHz, enable preamble puncturing for Orthogonal Frequency Division Multiple Access (OFDMA) and non-OFDMA transmissions and allow a resource unit (RU) or multiple resource unit (MRU) to be allocated to a single STA in an EHT PPDU. However, it is still an open issue to allocate RUs or MRUs in an EHT PPDU with large bandwidth, e.g., 320 MHz, in an efficient manner to maximize system throughput.

It would therefore be desirable to provide an effective and efficient mechanism/solution for resource unit allocation in an EHT PPDU with large bandwidth in a WLAN, especially in IEEE 802.11be EHT WLAN.

SUMMARY OF INVENTION

According to a first aspect of the invention, various embodiments of the invention provide a first method for SST operation in a WLAN performed at an AP. The method may comprise: setting, by an access point (AP), a target wake time (TWT) element of a TWT response to indicate a subchannel provided to a station (STA) as a temporary channel during a TWT service period (SP), wherein whether the subchannel is in a first channel or a second channel depends on a channel puncturing pattern of a basic service set (BSS) with which the STA is associated, and sending, by the AP, the TWT response to the STA to establish an individual TWT agreement between the AP and the STA.

According to a second aspect of the invention, various embodiments of the invention provide a second method for SST operation in a WLAN performed at an STA. The method may comprise: receiving, by an STA, a TWT response from an AP to establish an individual TWT agreement between the AP and the STA, wherein the TWT response comprises a TWT element which is set to indicate a subchannel provided to the STA as a temporary channel during a TWT SP, wherein whether the subchannel is in a first channel or a second channel depends on a channel puncturing pattern of a basic service set (BSS) with which the STA is associated, and operating, by the STA, at the provided subchannel as the temporary channel during the TWT SP.

According to a third aspect of the invention, various embodiments of the invention provide an AP for SST operation in a WLAN. The AP may comprise: a TWT element generation unit configured to set a TWT element of a TWT response to indicate a subchannel provided to an STA as a temporary channel during a TWT SP, wherein whether the subchannel is in a first channel or a second channel depends on a channel puncturing pattern of a BSS with which the STA is associated; and a transmission unit configured to send the TWT response to the STA to establish an individual TWT agreement between the AP and the STA.

BRIEF DESCRIPTION OF THE DRAWINGS

The invention will be described in detail with reference to the accompanying drawings, in which.

DETAILED DESCRIPTION OF EMBODIMENTS OF THE INVENTION

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only and is not intended to limit the scope of the invention.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements. As used herein, the term "and/or" includes any and all combinations of one or more of the associated listed items. As used herein, the terms "first," "second," and "third," etc. are used merely as labels and are not intended to impose numerical requirements on their objects. As used herein, the term "configured to" is interchangeable with "operative" or "adapted to".

Figure 1A:
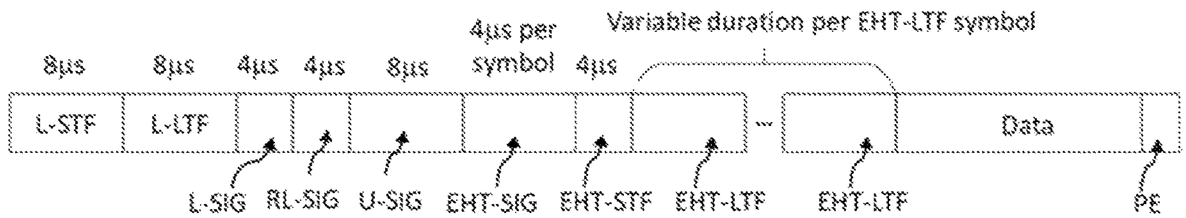
FIG. 1A is a block diagram showing a format of an EHT MU PPDU according to various embodiments of the invention.
Figure 1B:
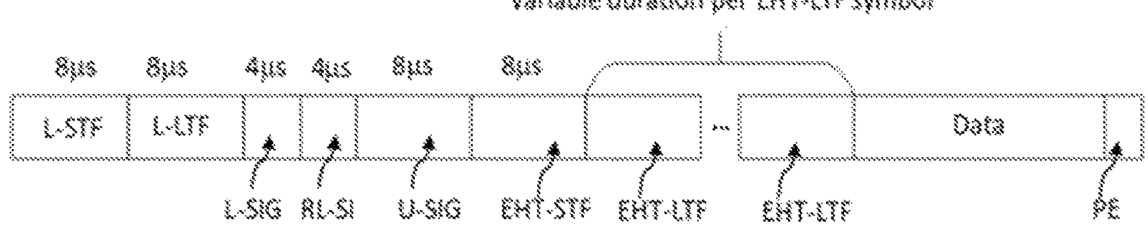
FIG. 1B is a block diagram showing a format of an EHT TB PPDU according to various embodiments of the invention.

In IEEE 802.11 be WLAN, an EHT PPDU may have any one of the following two formats: EHT MU PPDU and EHT TB PPDU. FIG. 1A is a block diagram showing a format of an EHT MU PPDU according to various embodiments of the invention. The EHT MU PPDU as shown in FIG. 1A is used for transmission to one or more users/STAs if the PPDU is not a response to a trigger frame from an AP. In an EHT MU PPDU, the Non-HT Short Training field (L-STF), Non-HT Long Training field (L-LTF), Non-HT Signal field (L-SIG), Repeated L-SIG (RL-SIG), Universal Signal field (U-SIG), and EHT Signal field (EHT-SIG) are called pre-EHT modulated fields while the EHT Short Training field (EHT-STF), EHT Long Training field (EHT-LTF), data field, and packet extension field (PE) are called EHT modulated fields. FIG. 1B is a block diagram showing a format of an EHT TB PPDU according to various embodiments of the invention. The EHT TB PPDU is used for a transmission that is a response to a trigger frame from an AP. In an EHT TB PPDU, the L-STF, L-LTF, L-SIG, RL-SIG, and U-SIG are called pre-EHT modulated fields while the EHT-STF, EHT-LTF, data field, and PE are called EHT modulated fields. The duration of the EHT-STF in the EHT TB PPDU is twice the duration of the EHT-STF in the EHT MU PPDU. For an EHT PPDU, each EHT-LTF symbol has the same GI (guard interval) duration as each data symbol, which is 0.8 μs, 1.6 μs, or 3.2 μs. The EHT-LTF comprises three types: 1×EHT-LTF, 2×EHT-LT and 4×EHT-LTF. The duration of each 1×EHT-LTF, 2×EHT-LTF, or 4×EHT-LTF symbol without GI is 3.2 μs, 6.4 μs, or 12.8 μs. Each data symbol without GI is 12.8 μs.

In various embodiments of the invention, when an EHT MU PPDU is transmitted to multiple STAs, an STA only needs to process up to one 80 MHz frequency subblock of the pre-EHT modulated fields of the EHT MU PPDU to get all the assignment information for itself; and no 80 MHz frequency subblock change is needed while processing L-SIG, U-SIG, and EHT-SIG, which makes it possible to enable SST operation for STAs.

In various embodiments of the invention, an STA that supports SST operation is an SST STA and an AP that supports SST operation is an SST AP. An SST STA may be a 20 MHz operating STA, an 80 MHz operating STA, or a 160 MHz operating STA. A 20 MHz operating STA is an STA that is operating in 20 MHz channel width mode, such as a 20 MHz-only STA or an 80/160/320 MHz capable STA that has reduced its operating channel width to 20 MHz using operating mode indication (OMI). An 80 MHz operating STA is an STA that is operating in 80 MHz channel width mode, such as an 80 MHz capable STA or a 160/320 MHz capable STA that has reduced its operating channel width to 80 MHz using OMI. A 160 MHz operating STA is a STA that is operating in 160 MHz channel width mode, such as a 160 MHz capable STA or a 320 MHz capable STA that has reduced its operating channel width to 160 MHz using OMI.

In various embodiments of the invention, if basic service set (BSS) bandwidth is equal to or larger than 40 MHz, SST operation may be enabled for 20 MHz operating STAs, otherwise SST operation shall be disabled for 20 MHz operating STAs. If BSS bandwidth is equal to or larger than 160 MHz, SST operation may be enabled for 80 MHz operating STAs, otherwise SST operation shall be disabled for 80 MHz operating STAs. If BSS bandwidth is equal to 320 MHz, SST operation may be enabled for 160 MHz operating STAs, otherwise SST operation shall be disabled for 160 MHz operating STA.

Figure 2A:
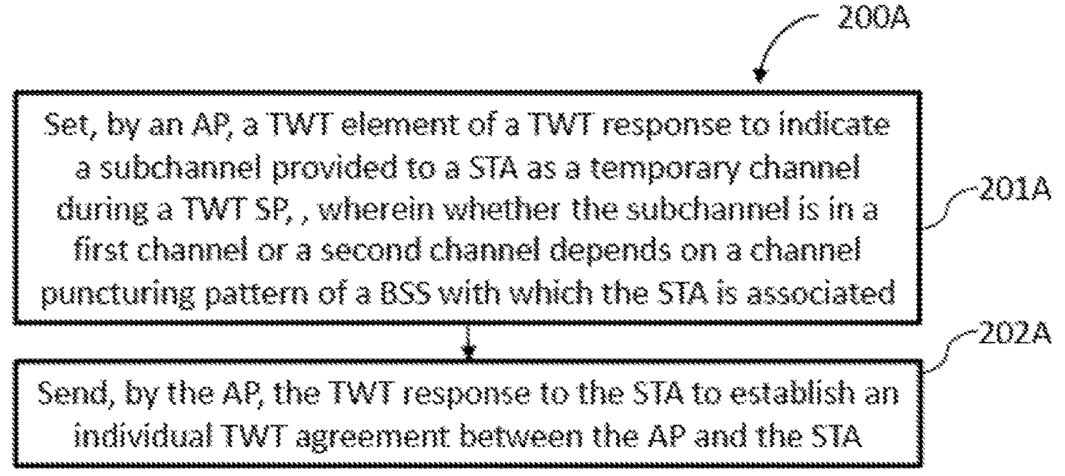
FIG. 2A is a flowchart illustrating a first method for SST operation in a WLAN carried out by an AP according to some embodiments of the invention.

In various embodiments of the invention, an STA and an AP may set up SST operation by negotiating an individual trigger-enabled TWT SP. FIG. 2A is a flowchart illustrating a first method 200A for SST operation in a WLAN carried out by an AP according to some embodiments of the invention.

At Block 201A, a TWT element of a TWT response, i.e., a TWT Setup frame with a TWT response, is set by the AP to indicate a subchannel provided to an STA as a temporary channel during a TWT SP, wherein whether the subchannel is in a first channel or a second channel depends on a channel puncturing pattern of a BSS with which the STA is associated.

In some embodiments of the invention, when an EHT PPDU is transmitted to or from multiple STAs including the STA during the TWT SP, the provided subchannel includes RUs or MRUs addressed to the STA.

In some embodiments of the invention, the first channel may be a primary 160 MHz channel of a 320 MHz BSS, and the second channel may be a secondary 160 MHz channel of the 320 MHz BSS.

In some embodiments of the invention, the first channel may be a lower 80 MHz channel of a 160 MHz BSS, and the second channel may be a higher 80 MHz channel of the 160 MHz BSS.

It should be noted that in various embodiments of the invention, the "in a (the) first channel" may include the first channel and any part/subchannel of the first channel" and the "in a (the) second channel" may include the second channel and any part/subchannel of the second channel, wherein the first channel and the second channel may include punctured channel(s). For example, when the first channel and the second channel are a primary 160 MHz channel (P160) and the secondary 160 MHz channel (S160) of a 320 MHz BSS, the P160 may include P160 and any part/subchannel of P160, e.g., lower 80 MHz of P160, higher 80 MHz of P160, any 40 MHz, and any 20 MHz of P160. Similarly, the "in a (the) secondary 160 MHz channel" may include the secondary 160 MHz channel (S160) and any part/subchannel of S160, e.g., lower 80 MHz of S160, higher 80 MHz of S160, any 40 MHz, and any 20 MHz of S160.

Further, the P160, S160, any 80 MHz of P160 or S160 of the 320 MHz BSS, and the lower or higher 80 MHz of the 160 MHz BSS may include punctured channels. Specifically, in the 320 MHz BSS, the 320 MHz channel including the P160 and S160 may include one punctured 40 MHz channel, or one punctured 80 MHz channel, or both. In the 160 MHz BSS, the 160 MHz channel which is equivalent to the P160 in the 320 MHz BSS may include one punctured 20 MHz channel, or one punctured 40 MHz channel. The selection of the subchannel for a STA as a temporary channel during a TWT SP depends on the channel puncturing pattern of the BSS with which the STA is associated in various embodiments of the invention.

At Block 202A, the TWT response is sent by the AP to the STA to establish an individual TWT agreement between the AP and the STA.

It should be noted that in these embodiments, the TWT response may be an unsolicited TWT response, i.e., the individual TWT agreement between the AP and the STA may be established by an unsolicited TWT response from the AP to the STA. However, in other embodiments, the TWT response may be set and sent to the STA after receiving a TWT request from the STA. Specifically, the first method 200A may further comprise: before setting the TWT element of the TWT response, a TWT request is received by the AP to establish an individual TWT agreement between the AP and the STA, wherein the TWT request comprises a TWT element which is set to indicate a subchannel proposed by the STA as the temporary channel during the TWT SP, wherein whether the subchannel is in the first channel or the second channel depends on a channel puncturing pattern of the BSS with which the STA is associated.

In various embodiments of the invention, the TWT element in the TWT request generated by the STA may have a same format with the TWT element in the TWT response generated by the AP. Therefore, the TWT element mentioned in various embodiments of the invention may refer to the TWT element in the TWT request or the TWT element in the TWT response unless it is clearly specified. Accordingly, the "subchannel" may refer to the subchannel provided to the STA in the TWT response or the subchannel proposed by the STA in the TWT request unless it is clearly specified.

Figure 2B:
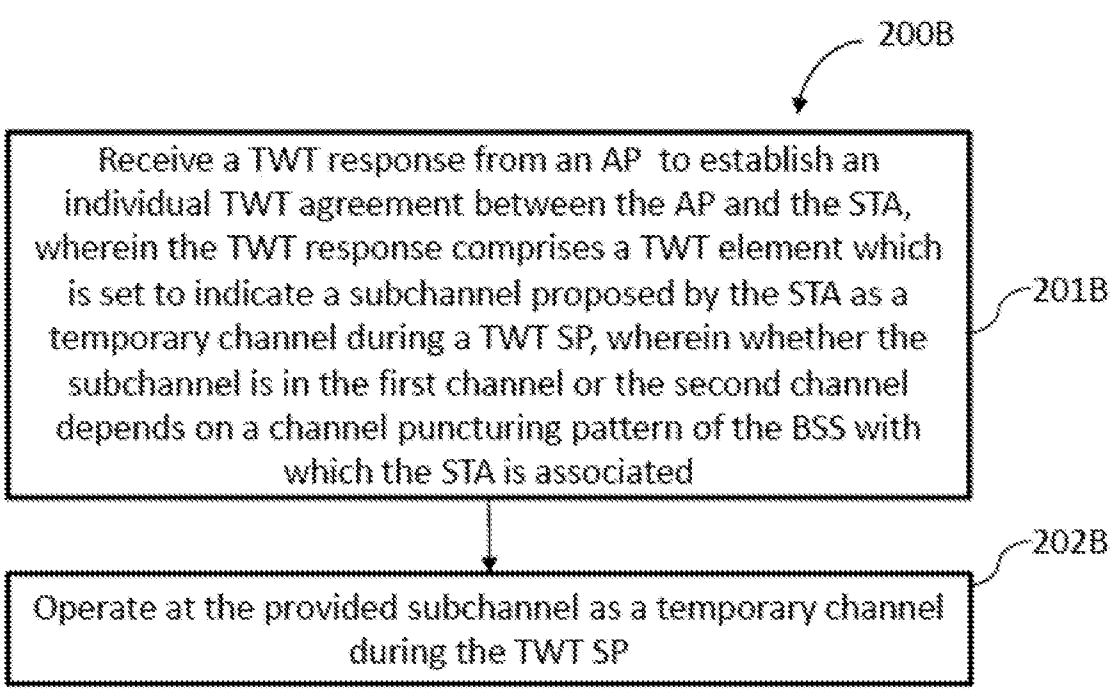
FIG. 2B is a flowchart illustrating a second method for SST operation in a WLAN carried out by an STA according to some embodiments of the invention.

FIG. 2B is a flowchart illustrating a second method 200B for SST operation in a WLAN carried out by an STA according to some embodiments of the invention.

At Block 201B, a TWT response from an AP is received by the STA to establish an individual TWT agreement between the AP and the STA, wherein the TWT response comprises a TWT element which is set to indicate a subchannel provided to the STA as a temporary channel during a TWT SP, wherein whether the subchannel is in the first channel or the second channel depends on a channel puncturing pattern of the BSS with which the STA is associated.

At Block 202B, the STA operates at the provided subchannel as a temporary channel during the TWT SP.

It should be noted that in these embodiments, the TWT response may be an unsolicited TWT response, i.e., the individual TWT agreement between the AP and the STA may be established by an unsolicited TWT response from the AP to the STA. However, in other embodiments, the TWT response may be set and sent to the STA after receiving a TWT request from the STA. Specifically, the second method 200B may further comprise: before receiving the TWT response from the AP, a TWT element of a TWT request is set by the STA to indicate a subchannel proposed by the STA as the temporary channel during the TWT SP, wherein whether the subchannel is in the first channel or the second channel depends on a channel puncturing pattern of the BSS with which the STA is associated, and the TWT request is sent to the AP by the STA to establish an individual TWT agreement between the AP and the STA.

SST Operation in a 320 MHz BSS

In some embodiments of the invention, when the SST operation is conducted in a 320 MHz BSS, the first channel refers to the primary 160 MHz channel of the 320 MHz BSS, and the second channel refers to the secondary 160 MHz channel of the 320 MHz BSS.

In some embodiments of the invention, the TWT element in the TWT response and/or the TWT request may include a Control field and a TWT Parameter Set field, wherein the TWT Parameter Set field may include a single Individual TWT Parameter Set field.

In some embodiments, the Individual TWT Parameter Set field may be set to include two TWT Channel fields, wherein one of the two TWT Channel fields is set to indicate the subchannel if the subchannel is in the primary 160 MHz channel; and the other one of the two TWT Channel fields is set to indicate the subchannel if the subchannel is in the secondary 160 MHz channel.

Alternatively, in some embodiments, the Control field of the TWT element may be set to indicate whether the subchannel is in the primary 160 MHz channel or the secondary 160 MHz channel, and the Individual TWT Parameter Set field of the TWT element comprises a single TWT Channel field which is set to indicate the subchannel in the primary 160 MHz channel or the secondary 160 MHz channel.

To indicate whether the subchannel is in the primary 160 MHz channel or the secondary 160 MHz channel, in some embodiments, the Control field may include a first subfield, i.e., an additional subfield, which is set to indicate whether the subchannel is in the primary 160 MHz channel or the secondary 160 MHz channel. Alternatively, in some other embodiments, a second subfield, i.e., a null data packet (NDP) Paging Indicator/PS160 subfield of the Control field may be set to indicate whether the subchannel is in the primary 160 MHz channel or the secondary 160 MHz channel if a Broadcast field of the Control field is set to indicate that information included in the TWT element is for negotiation of parameters of an individual TWT or a wake target beacon transmission time (TBTT) interval.

As mentioned above, in a 320 MHz BSS, the channel puncturing pattern may satisfy the following requirements: the 320 MHz channel with the primary 160 MHz channel and secondary 160 MHz channel may include one punctured 40 MHz channel, or one punctured 80 MHz channel, or both. According to this puncturing pattern of the 320 MHz BSS, in some embodiments of the invention, to effectively improve the system throughput, if the STA is a 160 MHz operating STA, the subchannel may not include a punctured channel or only include one punctured 40 MHz channel. Specifically, the subchannel may be the primary 160 MHz channel or the secondary 160 MHz channel without any punctured channel or with one punctured 40 MHz channel depending on the channel puncturing pattern of the 320 MHz BSS with which the STA is associated.

In some embodiments, if the STA is an 80 MHz operating STA, whether the subchannel is in one of the two 80 MHz frequency subblocks in the primary 160 MHz channel or one of the two 80 MHz frequency subblocks in the secondary 160 MHz channel depends on the channel puncturing pattern of the 320 MHz BSS with which the STA is associated. In these embodiments, to effectively improve the system throughput, the subchannel shall not include a punctured channel. Specifically, the subchannel may be one 80 MHz frequency subblock without any punctured channel in the 320 MHz channel of the 320 MHz BSS, e.g., lower or higher 80 MHz of the primary 160 MHz channel or the secondary 160 MHz channel, without any punctured channel therein.

In view of the above, if the STA is a 160 MHz operating SST STA, whether the subchannel is in the primary 160 MHz channel or the secondary 160 MHz channel depends on the puncturing pattern of the 320 MHz BSS with which the STA is associated. For example, if the 320 MHz channel has one 80 MHz channel punctured in the primary 160 MHz channel, the subchannel is in the secondary 160 MHz channel, vice versa. If the STA is an 80 MHz operating SST STA, which one of the four 80 MHz frequency subblocks in the 320 MHz channel of the 320 MHz BSS the subchannel is in depends on the puncturing pattern of the 320 MHz BSS with which the STA is associated. The four 80 MHz frequency subblocks include the lower 80 MHz of the primary 160 MHz channel, the higher 80 MHz of the primary 160 MHz channel, the lower 80 MHz of the secondary 160 MHz channel, and the higher 80 MHz of the secondary 160 MHz channel. For example, the subchannel shall not be in an 80 MHz frequency subblock of the 320 MHz channel which is punctured or has one 40 MHz channel punctured.

SST Operation in a 160 MHz BSS

In some embodiments of the invention, when the SST operation is conducted in a 160 MHz BSS, the first channel may refer to the lower 80 MHz channel of the 160 MHz BSS, and the second channel may refer to the higher 80 MHz channel of the 160 MHz BSS.

As mentioned above, in a 160 MHz BSS, the channel puncturing pattern may satisfy the following requirements: the 160 MHz channel which is equivalent to the P160 in the 320 MHz BSS may include one punctured 20 MHz channel, or one punctured 40 MHz channel. To effectively improve system throughput, if the STA is an 80 MHz operating STA, the subchannel does not include a punctured channel or only includes a punctured 20 MHz channel. Specifically, if the STA is an 80 MHz operating SST STA and the BSS bandwidth is 160 MHz, whether the subchannel is in the lower 80 MHz or higher 80 MHz of the 160 MHz channel depends on the puncturing pattern for the 160 MHz BSS with which the STA is associated. For example, if the 160 MHz channel has one 40 MHz channel punctured in the lower 80 MHz of the 160 MHz channel, the subchannel is in the higher 80 MHz of the 160 MHz channel, vice versa.

In some embodiments, the channel puncturing pattern may be indicated in an EHT Operation element in a Management frame transmitted by an AP to the STA.

Figure 2C:
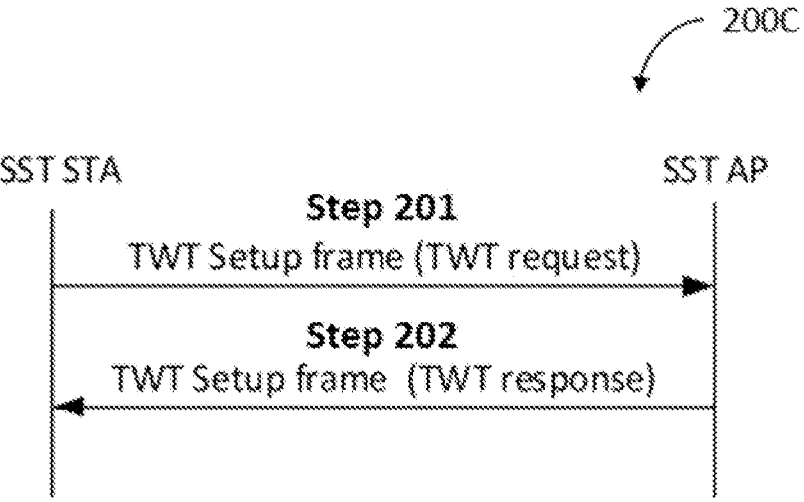
FIG. 2C is a schematic diagram illustrating a method for establishing an individual TWT agreement between an STA and an AP according to some embodiments of the invention.

FIG. 2C is a schematic diagram illustrating a method 200C for establishing an individual TWT agreement between an STA and an AP according to some embodiments of the invention. It should be noted that the STA and AP in these embodiments may be SST STA and SST AP.

At Step 201, the STA transmits a TWT request, i.e., a TWT Setup frame with a TWT request, to the AP. The TWT request may include a set of preferred TWT parameters for a trigger-enabled TWT SP, e.g., a future individual TWT SP start time, an interval between individual TWT SPs, a minimum duration of an individual TWT SP, and a subchannel proposed/requested by the STA as a temporary channel during a TWT SP.

At Step 202, After receiving the TWT request from the STA, the AP responds with a TWT response, i.e., a TWT Setup frame with a TWT response to the STA, wherein the TWT response may initiate an individual TWT agreement with the TWT parameters indicated in the TWT response for the trigger-enabled TWT SP, e.g., a future individual TWT SP start time, an interval between individual TWT SPs, a minimum duration of an individual TWT SP, and a subchannel provided to the STA as a temporary channel during a TWT SP.

After the individual TWT agreement is established between the STA and the AP, the STA will operate at the provided/negotiated subchannel which may not be a primary channel during the negotiated trigger-enabled TWT SP and operate at a primary channel outside the negotiated trigger-enabled TWT SP. During the negotiated trigger-enabled TWT SP, the RUs or MRUs which are allocated in EHT MU PPDUs and in Trigger frames for soliciting EHT TB PPDUs and addressed to the SST STA are in the negotiated subchannel. As a result, RUs or MRUs in an EHT PPDU may be allocated to multiple STAs with different operating bandwidth in an efficient manner, which may improve system throughput.

Figures 2D, 3A, 3B:
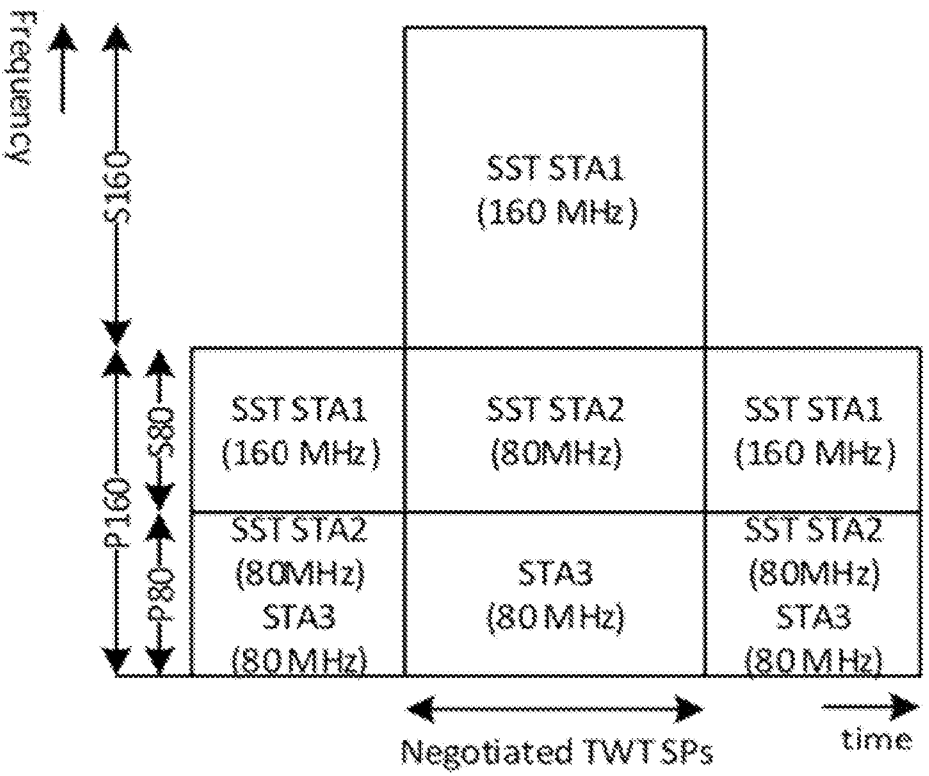
FIG. 2D is a schematic diagram illustrating an example of SST operation for STAs in a 320 MHz basic service set (BSS) according to some embodiments of the invention.
FIG. 3A is a diagram illustrating a format of a TWT Setup frame Action field according to some embodiments of the invention.
FIG. 3B is a block diagram illustrating a format of a TWT element according to some embodiments of the invention.

FIG. 2D is a schematic diagram illustrating an example of SST operation for STAs in a 320 MHz BSS according to some embodiments of the invention. In this embodiment, there are three STAs, i.e., STA1, STA2, STA3 in the 320 MHz BSS, wherein STA1 is a 160 MHz operating SST STA, STA2 is an 80 MHz operating SST STA and STA3 is an 80 MHz operating non-SST STA that always operates at a primary 80 MHz channel P80. The negotiated trigger-enabled TWT SP for STA1 is overlapping in time with that for STA2. During the negotiated trigger-enabled TWT SPs, STA1 and STA2 operate at a secondary 160 MHz channel S160 and a secondary 80 MHz channel S80, respectively. A 320 MHz EHT PPDU may be transmitted to or from STA1, STA2 and STA3, wherein the RUs or MRUs allocated to STA1, STA2 and STA3 are within the S160, S80 and P80, respectively. On the other hand, outside the negotiated trigger-enabled TWT SPs, STA1 and STA2 operate at a primary 160 MHz channel P160 and the P80, respectively. A 160 MHz EHT PPDU may be transmitted to or from STA1, STA2 and STA3, wherein the RUs or MRUs allocated to STA1, STA2 and STA3 are within the P160, P80 and P80, respectively. It is apparent that channel utilization is more efficient during the negotiated trigger-enabled TWT SPs than outside the negotiated trigger-enabled TWT SPs.

The TWT Setup frame is a kind of Unprotected S1G Action frame. FIG. 3A is a diagram illustrating a format of the TWT Setup frame Action field according to some embodiments of the invention. The TWT Setup frame comprises one or two TWT elements. FIG. 3B is a block diagram illustrating a format of the TWT element according to some embodiments of the invention. Referring to FIG. 3B, the TWT element includes an Element ID field with its value set to 216, a Length field, a Control field and a TWT Parameter Information field. In various embodiments of the invention, the Control field and the TWT Parameter Information field may be used to indicate the subchannel indicated in the TWT request or the TWT response.

Two embodiments of the invention will be described below to illustrate the method for SST operation in a WLAN according to various embodiments of the invention. It should be noted that these embodiments are provided for illustrative purposes only, not to limit the scope of the invention.

First Embodiment

In the first embodiment, the TWT Parameter Set field is set to indicate the subchannel in the primary 160 MHz channel or the secondary 160 MHz channel using two separate fields in a single Individual TWT Parameter Set field.

Figures 4A, 4B, 4C:
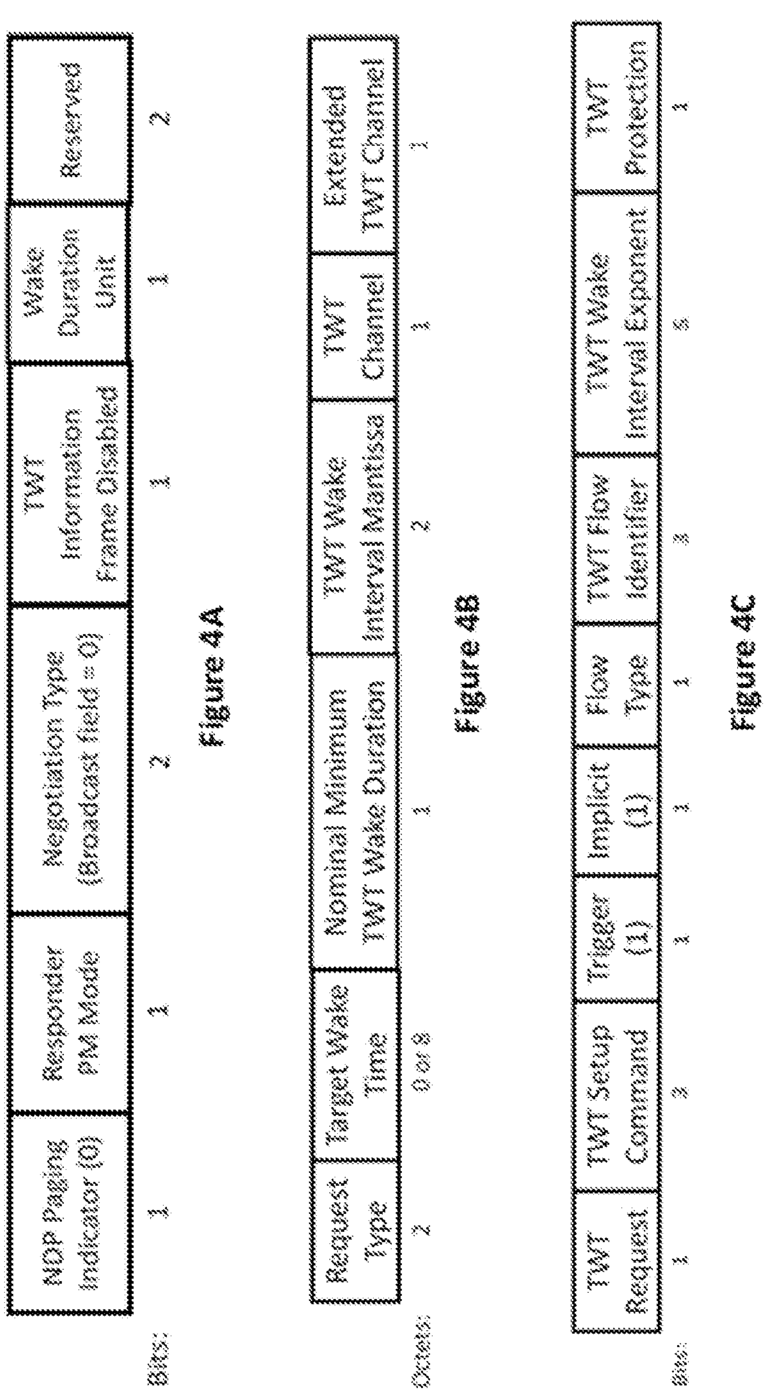
FIG. 4A is a block diagram illustrating a format of a Control field of a TWT element according to a first embodiment of the invention.
FIG. 4B is a block diagram illustrating a format of an Individual TWT Parameter Set field according to the first embodiment.
FIG. 4C is a block diagram illustrating a format of a Request Type field according to the first embodiment.

FIG. 4A is a block diagram illustrating a format of the Control field of the TWT element according to the first embodiment of the invention. Referring to FIG. 4A, the Control field includes a NDP Paging Indicator field and a Negotiation Type field. The NDP Paging Indicator field is set to indicate presence of a NDP Paging field in the TWT Parameter Information field. For example, the NDP Paging Indicator field may be set to 0 to indicate that the NDP Paging field is not present in the TWT Parameter Information field; and set to 1 to indicate that the NDP Paging field is present in the TWT Parameter Information field. The Negotiation Type field is set to indicate whether the information included in the TWT element is for the negotiation of parameters of broadcast or individual TWT(s) or a wake target beacon transmission time (TBTT) interval. A most significant bit (MSB) of the Negotiation Type field is a Broadcast field, which may be set to 0 to indicate that the information included in the TWT element is for the negotiation of parameters of individual TWT(s) or a wake TBTT interval; and set to 1 to indicate the information included in the TWT element is for the negotiation of parameters of broadcast TWT(s). The Broadcast field and the NDP Paging Indicator field may be set to 0 in all TWT elements during the individual TWT setup. In other words, the NDP Paging field may not be present in the TWT Parameter Information field during the individual TWT setup.

The TWT Parameter Information field includes a single Individual TWT Parameter Set field if the Broadcast field in the Control field is set to indicate that the information included in the TWT element is for the negotiation of parameters of individual TWT(s) or a wake TBTT interval, e.g., the Broadcast field is set to 0 in this embodiment. FIG. 4B is a block diagram illustrating a format of the Individual TWT Parameter Set field according to the first embodiment. In this embodiment, the Individual TWT Parameter Set field may include a Request Type field, a Target Wake Time field, a Nominal Minimum TWT Wake Duration field, a TWT Wake Interval Mantissa field, a TWT Channel field and an Extended TWT Channel field. The TWT Channel field and the Extended TWT Channel field are the two separate fields for indicating the subchannel in the primary 160 MHz channel or the secondary 160 MHz channel.

FIG. 4C is a block diagram illustrating a format of the Request Type field according to the first embodiment of the invention. The Request Type field may include a TWT Request field, a Trigger field, and an Implicit field. The TWT Request field is set to indicate whether TWT request information is included in the TWT element. For example, the TWT Request field may be set to 1 to indicate TWT request information is included in the TWT element; and set to 0 to indicate TWT response information is included in the TWT element. The Trigger field is set to indicate whether the TWT SP indicated by the TWT element includes triggering frames. For example, the Trigger field may be set to 1 to indicate that at least one triggering frame is transmitted during the TWT SP; and set to 0 to indicate that no trigger frame is transmitted during the TWT SP. The Implicit field is set to indicate whether an implicit TWT or an explicit TWT is being negotiated. For example, the Implicit field may be set to 1 to indicate an implicit TWT; and set to 0 to indicate an explicit TWT. The Trigger field and the Implicit field shall be set to 1 in all TWT elements during the individual trigger-enabled TWT setup.

The Target Wake Time field as shown in FIG. 4B is set to indicate a preferred/proposed future individual TWT SP start time for a TWT request or a given future individual TWT SP start for a TWT response. The TWT Wake Interval Mantissa field, together with the TWT Wake Interval Exponent field of the Request Type field, is set to indicate a preferred interval of individual TWT SPs for a TWT request or a given/provided interval of individual TWT SPs for a TWT response. The Nominal Minimum TWI Wake Duration field, together with the Wake Duration Unit field of the Control field, indicates a preferred minimum duration of an individual TWT SP for a TWT request or a given minimum duration of an individual TWT SP for a TWT response.

In this embodiment, the STA may be an SST STA and the AP is an SST AP. In various embodiments of the invention, if the subchannel provided to an STA as temporary channel during a TWT SP is a non-primary channel, SST operation is enabled for the SST STA.

In the first embodiment, the TWT Channel field may include a bitmap, e.g., a bitmap with eight bits, that is set to indicate the subchannel in a primary 160 MHz channel, which is being negotiated/proposed by the SST STA in a TWT request as a temporary channel during a TWT SP, or which is provided in the TWT response to the STA as a temporary channel during a TWT SP. The Extended TWT Channel field may include a bitmap, e.g., a bitmap with eight bits, that is set to indicate the subchannel in a secondary 160 MHz channel, which is being negotiated/proposed by the SST STA in a TWT request as a temporary channel during a TWT SP, or which is provided to the STA in a TWT response as a temporary channel during a TWT SP. Each bit in the bitmap in the TWT Channel field or the Extended TWT Channel corresponds to one 20 MHz channel for the band in which the SST AP's associated BSS is currently operating, with the least significant bit corresponding to the lowest numbered channel of the operating channel of the BSS.

According to the first embodiment, if the SST STA is a 20 MHz operating STA, in the TWT request generated by the SST STA, one bit of the TWT Channel field or the Extended TWT Channel field may be set to 1 to indicate a 20 MHz channel which is requested/proposed to be a temporary channel for the SST STA during a TWT SP, wherein the requested 20 MHz channel may not be a primary 20 MHz channel.

According to the first embodiment, if the SST STA that is an 80 MHz operating STA, in the TWT request generated by the SST STA, all the four LSBs or all the four MSBs in the TWT Channel field or the Extended TWT Channel field may be set to 1 to indicate an 80 MHz channel which is requested to be a temporary channel for the SST STA during a TWT SP, wherein the requested 80 MHz may not be a primary 80 MHz channel.

According to the first embodiment, if the SST STA is an 80 MHz operating STA and the BSS bandwidth is 160 MHz, i.e., a 80 MHz operating STA in a 160 MHz BSS, in the TWT request generated by the SST STA, three of the four LSBs or three of the four MSBs in the TWT Channel field may be set to 1 to indicate an 80 MHz channel which is requested to be a temporary channel for the SST STA during a TWT SP, wherein the requested 80 MHz channel may not be a primary 80 MHz channel and has one non-primary 20 MHz channel punctured.

According to the first embodiment, if the SST STA is a 160 MHz operating STA, in the TWT request generated by the SST STA, all the eight bits of the TWT Channel field or the Extended TWT Channel may be set to 1 to indicate a primary 160 MHz channel or a secondary 160 MHz channel which is requested to be a temporary channel for the SST STA during a TWT SP.

According to the first embodiment, if the SST STA is a 160 MHz operating STA, in the TWT request generated by the SST STA, six of the eight bits in the TWT Channel field or the Extended TWT Channel may be set to 1 to indicate a primary 160 MHz channel or a secondary 160 MHz channel which is requested to be a temporary channel for the SST STA during a TWT SP, wherein the requested channel has one punctured non-primary 40 MHz channel.

According to the first embodiment, if the SST STA is a 20 MHz operating STA, in the TWT response generated by the SST AP, one bit of the TWT Channel field or the Extended TWT Channel field may be set to 1 to indicate a 20 MHz channel which is provided to the SST STA as a temporary channel during a TWT SP, wherein the provided 20 MHz channel may not be a primary 20 MHz channel.

According to the first embodiment, if the SST STA that is an 80 MHz operating STA, in the TWT response generated by the SST AP, all the four LSBs or all the four MSBs in the TWT Channel field or the Extended TWT Channel field may be set to 1 to indicate an 80 MHz channel which is provided to the SST STA as a temporary channel during a TWT SP, wherein the provided 80 MHz channel may not be a primary 80 MHz channel.

According to the first embodiment, if the SST STA is an 80 MHz operating STA and the BSS bandwidth is 160 MHz, in the TWT response generated by the SST AP, three of the four LSBs or three of the four MSBs in the TWT Channel field or the Extended TWT Channel field may be set to 1 to indicate an 80 MHz channel which is provided to the SST STA as a temporary channel during a TWT SP, wherein the provided 80 MHz channel may not be a primary 80 MHz channel and has one punctured non-primary 20 MHz channel.

According to the first embodiment, if the SST STA is a 160 MHz operating STA, in the TWT response generated by the SST AP, all the eight bits of the TWT Channel field or the Extended TWT Channel may be set to 1 to indicate a primary 160 MHz channel or a secondary 160 MHz channel which is provided to the SST STA as a temporary channel during a TWT SP.

According to the first embodiment, if the SST STA is a 160 MHz operating STA, in the TWT response generated by the SST AP, six of the eight bits in the TWT Channel field or the Extended TWT Channel may be set to 1 to indicate a primary 160 MHz channel or a secondary 160 MHz channel which is provided to the SST STA as a temporary channel during a TWT SP, wherein the provided channel has one punctured non-primary 40 MHz channel.

Table 1 illustrates the bitmaps of the TWT channel field and the Extended TWT Channel field for some example subchannels provided to an 80 MHz operating SST STA as a temporary channel during a TWT SP in 160 MHz, BSS according to the first embodiment.

TABLE 1

| Subchannels provided to an SST STA as a temporary | TWT Channel field | | | | | | | |
|---|---|---|---|---|---|---|---|---|
| channel during a TWT SP | B1 | B1 | B2 | B3 | B4 | B5 | B6 | B7 |
| Lower 80 MHz | 1 | 1 | 1 | 1 | 0 | 0 | 0 | 0 |
| Higher 80 MHZ | 0 | 0 | 0 | 0 | 1 | 1 | 1 | 1 |
| Lower 80 MHz with the 3$^{rd}$ lowest 20 MHz channel punctured | 1 | 1 | 0 | 1 | 0 | 0 | 0 | 0 |
| Higher 80 MHz with the 3$^{rd}$ lowest 20 MHz channel punctured | 0 | 0 | 0 | 0 | 1 | 1 | 0 | 1 |

Table 2 illustrates the bitmaps of the TWT channel field and the Extended TWT Channel field for some example subchannels provided to an 80 MHz operating SST STA as a temporary channel during a TWT SP in a 320 MHz BSS according to the first embodiment.

TABLE 2

| Subchannels provided to an SST STA as a temporary channel during | TWT Channel field | | | | | | | | Extended TWT Channel field | | | | | | | |
|---|---|---|---|---|---|---|---|---|---|---|---|---|---|---|---|---|
| a TWT SP | B0 | B1 | B2 | B3 | B4 | B5 | B6 | B7 | B0 | B1 | B2 | B3 | B4 | B5 | B6 | B7 |
| Lower 80 MHZ of P160 | 1 | 1 | 1 | 1 | 0 | 0 | 0 | 0 | 0 | 0 | 0 | 0 | 0 | 0 | 0 | 0 |
| Higher 80 MHz of P160 | 0 | 0 | 0 | 0 | 1 | 1 | 1 | 1 | 0 | 0 | 0 | 0 | 0 | 0 | 0 | 0 |
| Lower 80 MHz of S160 | 0 | 0 | 0 | 0 | 0 | 0 | 0 | 0 | 1 | 1 | 1 | 1 | 0 | 0 | 0 | 0 |
| Higher 80 MHz of S160 | 0 | 0 | 0 | 0 | 0 | 0 | 0 | 0 | 0 | 0 | 0 | 0 | 1 | 1 | 1 | 1 |

Table 3 illustrates the bitmaps of the TWT channel field and the Extended TWT Channel field for some example subchannels provided to a 160 MHz operating SST STA as a temporary channel during a TWT SP in a 320 MHz BSS according to the first embodiment.

TABLE 3

| Subchannels provided to an SST STA as a temporary channel during | TWT Channel field | | | | | | | | Extended TWT Channel field | | | | | | | |
|---|---|---|---|---|---|---|---|---|---|---|---|---|---|---|---|---|
| a TWT SP | B0 | B1 | B2 | B3 | B4 | B5 | B6 | B7 | B0 | B1 | B2 | B3 | B4 | B5 | B6 | B7 |
| P160 | 1 | 1 | 1 | 1 | 1 | 1 | 1 | 1 | 0 | 0 | 0 | 0 | 0 | 0 | 0 | 0 |
| P160 with the 2nd lowest 40 MHz channel punctured | 1 | 1 | 0 | 0 | 1 | 1 | 1 | 1 | 0 | 0 | 0 | 0 | 0 | 0 | 0 | 0 |
| S160 | 0 | 0 | 0 | 0 | 0 | 0 | 0 | 0 | 1 | 1 | 1 | 1 | 1 | 1 | 1 | 1 |
| S160 with the 2nd lowest 40 MHz channel punctured | 0 | 0 | 0 | 0 | 0 | 0 | 0 | 0 | 1 | 1 | 0 | 0 | 1 | 1 | 1 | 1 |

Second Embodiment

In the second embodiment, in the TWT response generated by the SST AP, both of the control field and the individual TWT Parameter Set field of the TWT Parameter Information field are used to indicate the subchannel provided to the STA as a temporary channel during a TWT SP in a primary 160 MHz channel or a secondary 160 MHz channel. In the TWT request generated by the SST STA, both of the Control field and the Individual TWT Parameter Set field of the TWT Parameter Information field are used to indicate the subchannel proposed by the STA as a temporary channel during a TWT SP in a primary 160 MHz channel or a secondary 160 MHz channel. In this embodiment, the Individual TWT Parameter Set field only includes a single field to indicate the requested/provided subchannel as a temporary channel during a TWT SP.

Figures 5A, 5B, 5C:
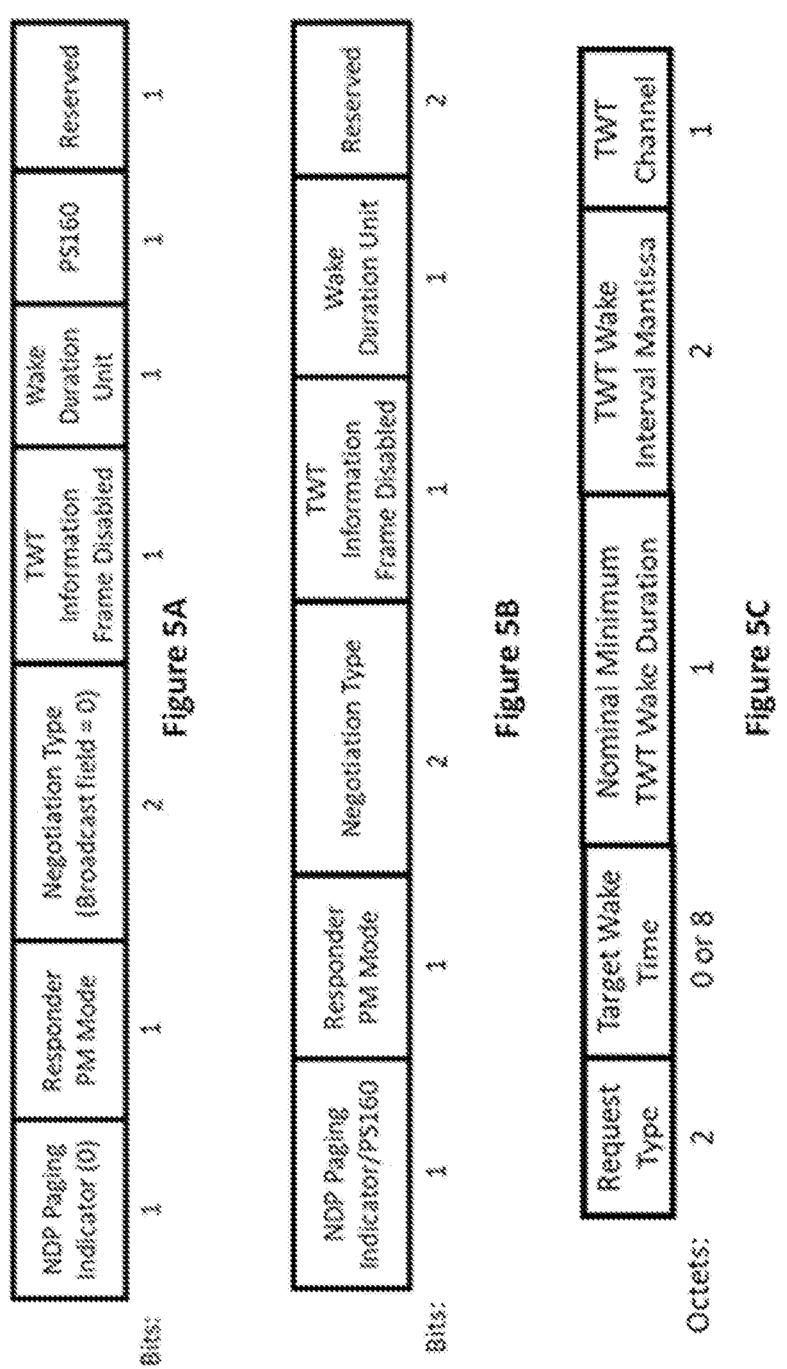
FIG. 5A is a block diagram illustrating a format of a Control field of a TWT element according to a second embodiment of the invention.
FIG. 5B is a block diagram illustrating an alternative format of the Control field of the TWT element according to the second embodiment.
FIG. 5C is a block diagram illustrating a format of an Individual TWT Parameter Set field according to the second embodiment.

FIG. 5A is a block diagram illustrating a format of the Control field of the TWT element according to the second embodiment. As shown in FIG. 5A, in this embodiment, the Control field may include a NDP Paging Indicator field, a Negotiation Type field and a PS160 field, i.e., the first field. The NDP Paging Indicator field is set to indicate the presence of the NDP Paging field in the TWT Parameter Information field. For example, the NDP Paging Indicator field may be set to 0 to indicate that the NDP Paging field is not present in the TWT Parameter Information field; and set to 1 to indicate that the NDP Paging field is pre-sent in the TWT Parameter Information field.

The Negotiation Type field is set to indicate whether the information included in the TWT element is for the negotiation of parameters of broadcast or individual TWT(s) or a wake TBTT interval. The MSB of the Negotiation Type field is the Broadcast field, which may be set to 0 to indicate that the information included in the TWT element is for the negotiation of parameters of individual TWT(s) or a wake TBTT interval; and set to 1 to indicate that the information included in the TWT element is for the negotiation of parameters of broadcast TWT(s). The Broadcast field and the NDP Paging Indicator field shall be set to 0 in all TWT elements during the individual TWT setup.

The PS160 field is set to indicate whether the subchannel indicated in the TWT Channel field as a temporary channel during a TWT SP is in a primary 160 MHz channel or a secondary 160 MHz channel. For example, the PS160 field may be set to 0 to indicate that the subchannel provided by the TWT Channel field as a temporary channel during a TWT SP is in the primary 160 MHz channel; and set to 1 to indicate the subchannel provided by the TWT Channel field as a temporary channel during a TWT SP is in the secondary 160 MHz channel.

FIG. 5B is a block diagram illustrating an alternative format of the Control field of the TWT element according to the second embodiment. As shown in FIG. 5B, the Control field may include a NDP Paging Indicator/PS160 field, i.e., the second field, and a Negotiation Type field.

The Negotiation Type field is set to indicate whether the information included in the TWT element is for the negotiation of parameters of broadcast or individual TWT(s) or a wake TBTT interval. The MSB of the Negotiation Type field is the Broadcast field, which may be set to 0 to indicate that the information included in the TWT element is for the negotiation of parameters of individual TWT(s) or a wake TBTT interval; and set to 1 to indicate the information included in the TWT element is for the negotiation of parameters of broadcast TWT(s).

The NDP Paging Indicator/PS160 field is interpreted according to the value of the Broadcast field. If the Broadcast field is set to indicate that the information included in the TWT element is for the negotiation of parameters of individual TWT(s) or a wake TBTT interval, e.g., the Broadcast field is set to 0, the NDP Paging Indicator/PS160 field is set to indicate whether the subchannel provided in the TWT Channel field as a temporary channel during a TWT SP is in a primary 160 MHz channel or a secondary 160 MHz channel. For example, the NDP Paging Indicator/PS160 field may be set to 0 to indicate the subchannel provided in the TWT Channel field as a temporary channel during a TWT SP is in a primary 160 MHz channel; and set to 1 to indicate the subchannel provided in the TWT Channel field as a temporary channel during a TWT SP is in a secondary 160 MHz channel. If the Broadcast field is set to indicate the information included in the TWT element is for the negotiation of parameters of broadcast TWT(s), e.g., the Broadcast field is set to 1, the NDP Paging Indicator/PS160 field is set to indicate whether a NDP Paging field is present in the TWT Parameter Information field. For example, the NDP Paging Indicator/PS160 field may be set to 0 to indicate that the NDP Paging field is not present in the TWT Parameter Information field; and set to 1 to indicate that the NDP Paging field is present in the TWT Parameter Information field.

In the second embodiment, the TWT Parameter Information field includes a single Individual TWT Parameter Set field if the Broadcast subfield in the Control field is set to indicate that the information included in the TWT element is for the negotiation of parameters of individual TWT(s) or a wake TBTT interval. FIG. 5C is a block diagram illustrating a format of the Individual TWT Parameter Set field according to the second embodiment. As shown in FIG. 5C, the Individual TWT Parameter Set field may include a Request Type field as illustrated in FIG. 4C and a single TWT Channel field. The TWT Channel field may include a bitmap, e.g., a bitmap with eight bits, that is set to indicate the subchannel in a primary 160 MHz channel or a secondary 160 MHz channel. Whether the subchannel provided in the TWT Channel field as a temporary channel during a TWT SP is in the primary or secondary 160 MHz channel depends on the value of the PS160 field or the NDP Paging Indicator/PS160 field in the Control field. For example, if the PS160 field or the NDP Paging Indicator/PS160 field of the Control field is set to 0, the subchannel provided in the TWT Channel field as a temporary channel during a TWT SP is in the primary 160 MHz channel. If the PS160 field or the NDP Paging Indicator/PS160 field of the Control field is set to 1, the subchannel provided in the TWT Channel field as a temporary channel during a TWT SP is in the secondary 160 MHz channel. Each bit in the bitmap corresponds to one 20 MHz channel for the band in which the AP's associated BSS is currently operating, with the least significant bit corresponding to the lowest numbered channel of the operating channels of the BSS.

According to the second embodiment, if the SST STA is a 20 MHz operating STA, in the TWT request generated by the SST STA, one bit of the TWT Channel field may be set to 1 and the PS160 field or the NDP Paging Indicator/PS160 field may be set to 0 or 1 to indicate a 20 MHz channel which is requested to be a temporary channel for the SST STA during a TWT SP, wherein the requested 20 MHz channel may not be a primary 20 MHz channel.

According to the second embodiment, if the SST STA is an 80 MHz operating STA, in the TWT request generated by the SST STA, all the four LSBs or all the four MSBs in the TWT Channel field may be set to 1 and the PS160 field or the NDP Paging Indicator/PS160 field may be set to 0 or 1 to indicate an 80 MHz channel which is requested to be a temporary channel for the SST STA during a TWT SP, wherein the 80 MHz channel may not be a primary 80 MHz channel.

According to the second embodiment, if the SST STA is an 80 MHz operating STA and the BSS bandwidth is 160 MHz, in the TWT request generated by the SST STA, three of the four LSBs or three of the four MSBs in the TWT Channel field may be set to 1 and the PS160 field or the NDP Paging Indicator/PS160 field may be set to 0 or 1 to indicate an 80 MHz channel which is requested to be a temporary channel for the SST STA during a TWT SP, wherein the requested 80 MHz channel may not be a primary 80 MHz channel and includes one punctured non-primary 20 MHz channel.

According to the second embodiment, if the SST STA is a 160 MHz operating STA, in the TWT request generated by the SST STA, all the eight bits of the TWT Channel field may be set to 1 and the PS160 field or the NDP Paging Indicator/PS160 field may be set to 0 or 1 to indicate a primary 160 MHz channel or a secondary 160 MHz channel which is requested to be a temporary channel for the SST STA during a TWT SP.

According to the second embodiment, if the SST STA is a 160 MHz operating STA, in the TWT request generated by the SST STA, six of the eight bits in the TWT Channel field may be set to 1 and the PS160 field or the NDP Paging Indicator/PS160 field may be set to 0 or 1 to indicate a primary 160 MHz channel or a secondary 160 MHz channel which is requested to be a temporary channel for the SST STA during a TWT SP, wherein the requested 160 MHz channel includes one punctured non-primary 40 MHz channel.

According to the second embodiment, if the SST STA is a 20 MHz operating STA, in the TWT response generated by the SST AP, one bit of the TWT Channel field may be set to 1 and the PS160 field or the NDP Paging Indicator/PS160 field may be set to 0 or 1 to indicate a 20 MHz channel which is provided to the SST STA as a temporary channel during a TWT SP, wherein the provided 20 MHz channel may not be a primary 20 MHz channel.

According to the second embodiment, if the SST STA is an 80 MHz operating STA, in the TWT response generated by the SST AP, all the four LSBs or all the four MSBs in the TWT Channel field may be set to 1 and the PS160 field or the NDP Paging Indicator/PS160 field may be set to 0 or 1 to indicate an 80 MHz channel which is provided to the SST STA as a temporary channel during a TWT SP, wherein the provided 80 MHz channel may not be a primary 80 MHz channel.

According to the second embodiment, if the SST STA is an 80 MHz operating STA and the BSS bandwidth is 160 MHz, in the TWT response generated by the SST AP, three of the four LSBs or three of the four MSBs in the TWT Channel field may be set to 1 and the PS160 field or the NDP Paging Indicator/PS160 field may be set to 0 or 1 to indicate an 80 MHz channel which is provided to the SST STA as a temporary channel during a TWT SP, wherein the provided 80 MHz channel may not be a primary 80 MHz channel and includes one punctured non-primary 20 MHz channel.

According to the second embodiment, if the SST STA is a 160 MHz operating STA, in the TWT response generated by the SST AP, all the eight bits of the TWT Channel field may be set to 1 and the PS160 field or the NDP Paging Indicator/PS160 field may be set to 0 or 1 to indicate a primary 160 MHz channel or a secondary 160 MHz channel which is provided to the SST STA as a temporary channel during a TWT SP.

According to the second embodiment, if the SST STA is a 160 MHz operating STA, in the TWT response generated by the SST AP, six of the eight bits in the TWT Channel field may be set to 1 and the PS160 field or the NDP Paging Indicator/PS160 field may be set to 0 or 1 to indicate a primary 160 MHz channel or a secondary 160 MHz channel which is provided to the SST STA as a temporary channel, wherein the provided 160 MHz channel includes one punctured non-primary 40 MHz channel.

Table 4 illustrates settings of the TWT channel field and the PS160 field or the NDP Paging Indicator/PS160 field for some example subchannels provided to an 80 MHz operating SST STA as a temporary channel during a TWT SP in a 160 MHz BSS according to the second embodiment.

TABLE 4

| Subchannel provided to an SST STA as a temporary channel during a TWT SP | PS160 or NDP Paging Indication/PS160 field | TWT Channel field B0 | B1 | B2 | B3 | B4 | B5 | B6 | B7 |
|---|---|---|---|---|---|---|---|---|---|
| Lower 80 MHz with | 0 | 1 | 1 | 1 | 1 | 0 | 0 | 0 | 0 |
| Higher 80 MHz | 0 | 0 | 0 | 0 | 0 | 1 | 1 | 1 | 1 |
| Lower 80 MHz with the 3rd lowest 20 MHz channel punctured | 0 | 1 | 1 | 0 | 1 | 0 | 0 | 0 | 0 |
| Higher 80 MHz with the 3rd lowest 20 MHz channel punctured | 0 | 0 | 0 | 0 | 0 | 1 | 1 | 0 | 1 |

Table 5 illustrates settings of the TWT channel field and the PS160 field or the NDP Paging Indicator/PS160 field for some example subchannels provided to an 80 MHz operating SST STA as a temporary channel during a TWT SP in a 320 MHz BSS according to the second embodiment.

TABLE 5

| Subchannel provided to an SST STA as a temporary channel during a TWT SP | PS160 or NDP Paging Indication/PS160 field | TWT Channel field B0 | B1 | B2 | B3 | B4 | B5 | B6 | B7 |
|---|---|---|---|---|---|---|---|---|---|
| Lower 80 MHz of P160 | 0 | 1 | 1 | 1 | 1 | 0 | 0 | 0 | 0 |
| Higher 80 MHz of P160 | 0 | 0 | 0 | 0 | 0 | 1 | 1 | 1 | 1 |
| Lower 80 MHz of S160 | 1 | 1 | 1 | 1 | 1 | 0 | 0 | 0 | 0 |
| Higher 80 MHz of S160 | 1 | 0 | 0 | 0 | 0 | 1 | 1 | 1 | 1 |

Table 6 illustrates settings of the TWT channel field and the PS160 field or the NDP Paging Indicator/PS160 field for some example subchannels provided to a 160 MHz operating, SST STA as a temporary channel during a TWT SP in a 320 MHz BSS according to the second embodiment.

TABLE 6

| Subchannel provided to an SST STA as a temporary channel during a TWT SP | PS160 or NDP Paging Indication/PS160 field | TWT Channel field B0 | B1 | B2 | B3 | B4 | B5 | B6 | B7 |
|---|---|---|---|---|---|---|---|---|---|
| P160 | 0 | 1 | 1 | 1 | 1 | 1 | 1 | 1 | 1 |
| P160 with the 2nd lowest 40 MHz channel punctured | 0 | 1 | 1 | 0 | 0 | 1 | 1 | 1 | 1 |
| S160 | 1 | 1 | 1 | 1 | 1 | 1 | 1 | 1 | 1 |
| S160 with the 2nd lowest 40 MHz channel punctured | 1 | 1 | 1 | 0 | 0 | 1 | 1 | 1 | 1 |

According to various embodiments of the invention, the subchannel provided to an SST STA or the subchannel proposed by an SST STA as a temporary channel during a TWT SP shall be determined based on the channel puncturing pattern of a BSS with which the SST STA is associated, which may be indicated in an information element most recently received by the SST STA. It should be noted that the examples of the subchannel provided to an SST STA shown in the tables above may also be used as a subchannel proposed by an SST STA as a temporary channel during a TWT SP when generating a TWT request by the SST STA.

The information element which is set to indicate the channel puncturing pattern for a BSS may be an EHT Operation element. The EHT Operation element may be included in a Management frame transmitted by an AP to the SST STA, such as a Beacon frame, a Probe Response frame, an Association Response frame, or an Reassociation Response frame.

Figure 6A:
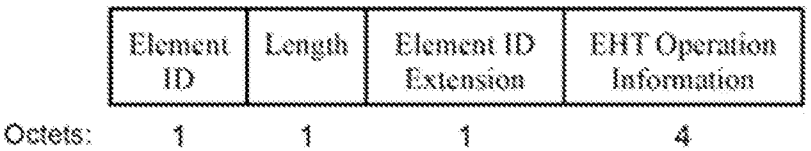
FIG. 6A is a block diagram illustrating a format of an EHT Operation element according to some embodiments of the invention.

FIG. 6A is a block diagram illustrating a format of an EHT Operation element according to some embodiments of the invention. Referring to FIG. 6A, the EHT Operation element may include an Element ID field, a Length field, an Element ID Extension field and an EHT Operation Information field.

Figure 6B:
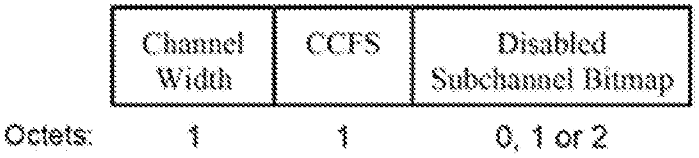
FIG. 6B is a block diagram illustrating a format of an EHT Operation Information field of the EHT Operation element according to some embodiments of the invention.

FIG. 6B is a block diagram illustrating a format of the EHT Operation Information field of the EHT Operation element according to some embodiments of the invention. Referring to FIG. 6B, the EHT Operation Information field may include a Channel Width subfield, a CCFS subfield, and a Disabled Subchannel Bitmap Indication subfield. The Channel Width subfield may be set to indicate the BSS bandwidth, which may be 20 MHz, 40 MHz, 80 MHz, 160 MHz, or 320 MHz. For a 20, 40, or 80 MHz BSS bandwidth, the CCFS subfield may be set to indicate the channel center frequency index for the 20, 40, 80, 160 or 320 MHz channel on which the BSS operates.

The Disabled Subchannel Bitmap subfield may be set to indicate a channel puncturing pattern for the BSS; and the size of the Disabled Subchannel Bitmap subfield may depend on a setting of the Channel Width subfield. In one example, if the Channel Width subfield is set to indicate 20 MHz or 40 MHz BSS bandwidth, the Disabled Subchannel Bitmap subfield is not present in the EHT Operation Information field. If the Channel Width subfield is set to indicate 80 MHz or 160 MHz BSS bandwidth, the Disabled Subchannel Bitmap subfield may include an 8-bit bitmap with eight bits B0-B7. The 8-bit bitmap may be set to indicate which 20 MHz channel is punctured in the 80 MHz or 160 MHz BSS operating channel, where B0 applies to the lowest frequency 20 MHz channel and B7 to the highest frequency 20 MHz channel. For each of the bits B0-B7, a value of 0 may indicate that the corresponding 20 MHz channel is punctured, and a value of 1 is used otherwise. In terms of 80 MHz BSS bandwidth, each of the bits B4-B7 is reserved or set to 0. If the Channel Width subfield is set to indicate 320 MHz BSS bandwidth, the Disabled Subchannel Bitmap subfield may include a 16-bit bitmap with 16 bits B0-B15. The 16-bit bitmap is set to indicate which 20 MHz channel is punctured in the 320 MHz BSS operating channel, where B0 applies to the lowest frequency 20 MHz channel and B15 to the highest frequency 20 MHz channel. For each of the bits B0-B15, a value of 0 may indicate that the corresponding 20 MHz channel is punctured, and a value of 1 is used otherwise.

Figure 7:
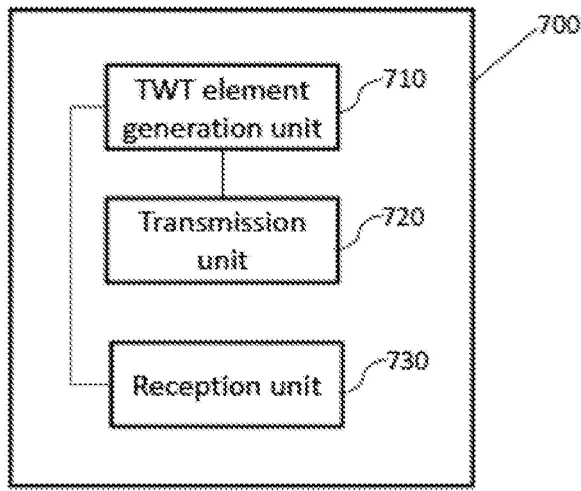
FIG. 7 is a schematic diagram illustrating an AP according to some embodiments of the invention.

Various embodiments of the invention also provide an AP for SST operation in a WLAN. FIG. 7 is a schematic diagram illustrating an AP 700 according to some embodiments of the invention. Referring to FIG. 7, the AP 700 may include a TWT element generation unit 710 configured to set a TWT element of a TWT response to indicate a subchannel provided to an STA as a temporary channel during a TWT SP, wherein whether the subchannel is in a first channel or a second channel depends on a channel puncturing pattern of a BSS with which the STA is associated, and a transmission unit 720 configured to send the TWT response to the STA.

In these embodiments, the STA is an SST STA to establish an individual TWT agreement between the AP and the STA.

In some embodiments, the AP 700 may further include a reception unit 730 configured to setting the TWT element of the TWT response, receive a TWT request from the STA to establish an individual TWT agreement between the AP and the STA, wherein the TWT request comprises a TWT element which is set to indicate a subchannel proposed by the STA as the temporary channel during the TWT SP, wherein whether the subchannel is in the first channel or the second channel depends on a channel puncturing pattern of the BSS with which the STA is associated.

Figure 8:
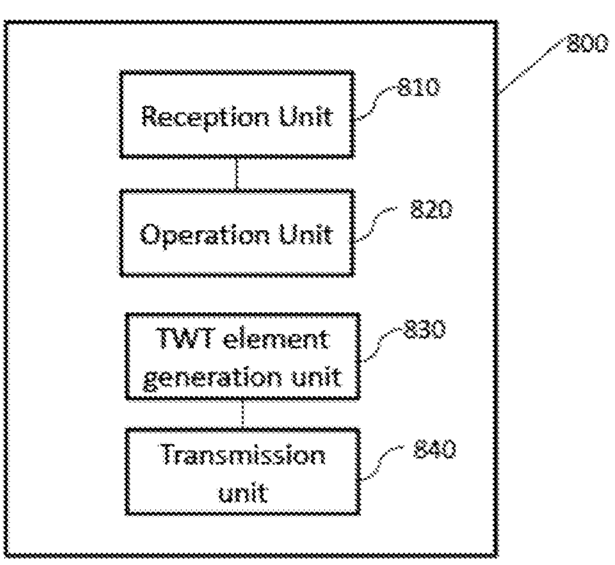
FIG. 8 is a schematic diagram illustrating an STA according to some embodiments of the invention.

Various embodiments of the invention also provide an STA for SST operation in a WLAN. FIG. 8 is a schematic diagram illustrating an STA 800 according to some embodiments of the invention. Referring to FIG. 8, the STA 800 may include a reception unit 810 configured to receive a TWT response from an AP to establish an individual TWT agreement between the AP and the STA, wherein the TWT response comprises a TWT element which is set to indicate a subchannel provided to the STA as a temporary channel during a TWT SP, wherein whether the subchannel is in a first channel or a second channel depends on a channel puncturing pattern of a basic service set (BSS) with which the STA is associated, and an operation unit 820 configured to operate at the provided subchannel as the temporary channel during the TWT SP.

In some embodiments, the STA 800 may further include a TWT element generation unit 830 configured to before receiving the TWT response, set a TWT element of a TWT request to indicate a subchannel proposed by the STA as the temporary channel during the TWT SP, wherein whether the subchannel is in the first channel or the second channel depends on a channel puncturing pattern of the BSS with which the STA is associated, and a transmission unit 840 configured to send the TWT request to the AP to establish an individual TWT agreement between the AP and the STA.

In some embodiments, the first channel may be a primary 160 MHz channel of a 320 MHz BSS, and the second channel may be a secondary 160 MHz channel of the 320 MHz BSS.

In these embodiments, the TWT element in the TWT response and/or the TWT request includes a control field and a TWT parameter set field, wherein the TWT parameter set filed may include a single Individual TWT Parameter Set field.

In these embodiments, the individual TWT Parameter Set field may be set to include two subfields, wherein one of the two TWT Channel fields is set to indicate the subchannel if the subchannel is in the primary 160 MHz channel; and the other one of the two TWT Channel fields is set to indicate the subchannel if the subchannel is in the secondary 160 MHz channel.

Alternatively, in these embodiments, the control field of the TWT element may be set to indicate whether the subchannel is in the primary 160 MHz channel or the secondary 160 MHz channel, and the individual TWT parameter set field of the TWT element comprises a single TWT Channel field which is set to indicate the subchannel in the primary 160 MHz channel or the secondary 160 MHz channel.

To indicate whether the subchannel is in the primary 160 MHz channel or the secondary 160 MHz channel, in these embodiments, the control field may include a first subfield, i.e., an additional subfield, which is set to indicate whether the subchannel is in the primary 160 MHz channel or the secondary 160 MHz channel. Alternatively, in some other embodiments, a null data packet (NDP) Paging Indicator subfield of the control field may be set to indicate whether the subchannel is in the primary 160 MHz channel or the secondary 160 MHz channel if a Broadcast field of the control field is set to indicate that information included in the TWT element is for negotiation of parameters of an individual TWT or a wake target beacon transmission time (TBIT) interval.

In these embodiments, if the STA is a 160 MHz operating STA, the subchannel may not include a punctured channel or only includes a punctured 40 MHz channel.

In these embodiments, if the STA is an 80 MHz operating STA, whether the subchannel is in one of the two 80 MHz frequency subblocks in the primary 160 MHz channel or one of the two 80 MHz frequency subblocks in the secondary 160 MHz channel depends on a channel puncturing pattern of the 320 MHz BSS with which the STA is associated. In these embodiments, to effectively improve system throughput, the subchannel shall not include a punctured channel.

In some embodiments, the first channel may be a lower 80 MHz channel of a 160 MHz BSS with which the STA is associated, and the second channel may be a higher 80 MHz channel of the 160 MHz BSS.

In these embodiments, if the STA is an 80 MHz operating STA, the subchannel does not include a punctured channel or includes a punctured 20 MHz channel.

In various embodiments, the channel puncturing pattern of a BSS with which the STA is associated may be indicated in an EHT Operation element in a Management frame transmitted by an AP to the STA.

Various embodiments of the invention also provide an AP for SST operation in a WLAN. The AP may include a memory to store instructions for performing the first method for SST operation in the WLAN, and a processor communicably coupled with the memory, the processor configured to execute the instructions to perform the first method for SST operation in a WLAN as described in various embodiments of the invention.

Various embodiments of the invention also provide an STA for SST operation in a WLAN. The STA may include a memory to store instructions for performing the second method for SST operation in the WLAN, and a processor communicably coupled with the memory, the processor configured to execute the instructions to perform the second method for SST operation in a WLAN as described in various embodiments of the invention.

Various embodiments of the invention also provide a computer program product comprising instructions to cause a computer to perform any method for SST operation in a WLAN according to any embodiment of the invention, when executed thereon.

Various embodiments of the invention also provide a computer program comprising instructions to cause a computer to perform a method for SST operation in a WLAN according to any embodiment of the invention, when executed thereon.

Various embodiments of the invention also provide a non-volatile storage medium comprising computer program codes to cause a computer to perform a method for SST operation in a WLAN according to any embodiment of the invention, when executed thereon.

Various embodiments of the invention also provide a chip configured to perform a method for SST operation in a WLAN according to any embodiment of the invention.

At least some steps of the methods for SST operation in a WLAN according to any embodiments of the invention described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media.

As described above, with the methods and devices for SST operation in a WLAN provided in various embodiments of the invention, after an individual TWT agreement is established between an SST STA and an SST AP through a solicited or unsolicited TWT response, a subchannel is provided to the SST STA as a temporary channel during a TWT SP wherein whether the subchannel is in a first channel or a second channel depends on a channel puncturing pattern of a BSS with which the STA is associated. For example, in a 320 MHz BSS, whether the subchannel is in a primary 160 MHz channel or a secondary 160 MHz channel depends on the channel puncturing pattern of the 320 MHz BSS. In a 160 MHz BSS, whether the subchannel is in a lower 80 MHz channel or a higher 80 MHz channel of the 160 MHz channel depends on the channel puncturing pattern of the 160 MHz BSS. As such, the SST STA will operate at the provided subchannel which may not be a primary channel during the TWT SP and operate at a primary channel outside the TWT SP. During the TWT SP, the RUs or MRUs addressed to the SST STA are included in the provided subchannel. As a result, with the methods and devices proposed in various embodiments of the invention, RUs or MRUs in an EHT PPDU may be allocated to multiple STAs with different operating bandwidth in an efficient manner, the system throughput will be significantly improved accordingly.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

What is claimed is:

1. A method for selective subchannel transmission (SST) operation in a wireless local area network (WLAN), the method comprising:

receiving, by an access point (AP), a target wake time (TWT) request from a station (STA) to establish an individual TWT agreement between the AP and the STA, wherein the TWT request comprises a TWT element which is set to indicate a suggested subchannel proposed by the STA as a temporary channel during a TWT service period (SP), wherein whether the suggested subchannel is in a first channel or a second channel depends on a channel puncturing pattern of a basic service set (BSS) with which the STA is associated;

setting, by the AP, a TWT element of a TWT response to indicate a selected subchannel provided to the STA as the temporary channel during the TWT SP, wherein whether the selected subchannel is in the first channel or the second channel depends on the channel puncturing pattern of the BSS with which the STA is associated, wherein the channel puncturing pattern is a puncturing pattern of a 320 MHz BSS, the first channel is a primary 160 MHz channel of the 320 MHz BSS, the second channel is a secondary 160 MHz channel of the 320 MHz BSS, and the channel puncturing pattern satisfies that the 320 MHz BSS comprises at least one of a punctured 40 MHz channel or a punctured 80 MHz channel, wherein whether the selected subchannel is in the first channel or the second channel depends on the channel puncturing pattern of the BSS with which the STA is associated comprises:

if the STA is a 160 MHz operating STA, the selected subchannel is in a channel not including a punctured channel or in a channel including the punctured 40 MHz channel; and sending, by the AP, the TWT response to the STA to establish the individual TWT agreement between the AP and the STA.

2. The method according to claim 1, wherein an individual TWT parameter set field of the TWT element comprises two TWT channel fields, wherein one of the two TWT channel fields is set to indicate the selected subchannel if the selected subchannel is in the primary 160 MHz channel and the other one of the two TWT channel fields is set to indicate the selected subchannel if the selected subchannel is in the secondary 160 MHz channel.

3. The method according to claim 1, wherein a control field of the TWT element is set to indicate whether the selected subchannel is in the primary 160 MHz channel or the secondary 160 MHz channel, and an individual TWT parameter set field of the TWT element comprises a single TWT channel field which is set to indicate the selected subchannel in the primary 160 MHz channel or the secondary 160 MHz channel.

4. The method according to claim 3, wherein the control field comprises a first subfield which is set to indicate whether the selected subchannel is in the primary 160 MHz channel or the secondary 160 MHz channel.

5. The method according to claim 3, wherein the control field comprises a second subfield which is set to indicate whether the selected subchannel is in the primary 160 MHz channel or the secondary 160 MHz channel if a Broadcast field of the control field is set to indicate that information included in the TWT element is for negotiation of parameters of an individual TWT or a wake target beacon transmission time (TBTT) interval.

6. The method according to claim 1, wherein if the STA is an 80 MHz operating STA, whether the selected subchannel is in one of the two 80 MHz frequency subblocks in the primary 160 MHz channel or one of the two 80 MHz frequency subblocks in the secondary 160 MHz channel depends on a channel puncturing pattern of the 320 MHz BSS with which the STA is associated.

7. The method according to claim 6, wherein the selected subchannel does not include a punctured channel.

8. The method according to claim 1, wherein if the primary 160 MHz channel comprises the punctured 80 MHz channel and the secondary 160 MHz channel does not comprise a punctured channel, the selected subchannel is in the secondary 160 MHz channel, or if the secondary 160 MHz channel comprises the punctured 80 MHz channel and the primary 160 MHz channel does not comprise a punctured channel, the selected subchannel is in the primary 160 MHz channel.

9. The method according to claim 1, wherein if the primary 160 MHz channel comprises the punctured 40 MHz channel and the secondary 160 MHz channel does not comprise a punctured channel, the selected subchannel is in the secondary 160 MHz channel, or if the secondary 160 MHz channel comprises the punctured 40 MHz channel and the primary 160 MHz channel does not comprise a punctured channel, the selected subchannel is in the primary 160 MHz channel.

10. The method according to claim 1, wherein the channel puncturing pattern is indicated in an extremely high throughput (EHT) Operation element in a Management frame to the STA.

11. The method according to claim 1, wherein if the primary 160 MHz channel comprises the punctured 80 MHz channel and the secondary 160 MHz channel comprises the punctured 40 MHz channel, the selected subchannel is in the secondary 160 MHz channel, or if the secondary 160 MHz channel comprises the punctured 80 MHz channel and the primary 160 MHz channel comprises the punctured 40 MHz channel, the selected subchannel is in the primary 160 MHz channel.

12. The method according to claim 1, wherein in a case that the 320 MHz BSS includes the punctured 40 MHz channel or the punctured 80 MHz channel, the selected subchannel is in the channel not including the punctured channel.

13. The method according to claim 1, wherein in a case that the 320 MHz BSS includes the punctured 40 MHz channel and the punctured 80 MHz channel, the selected subchannel is in the channel including the punctured 40 MHz channel.

14. A method for selective subchannel transmission (SST) operation in a wireless local area network (WLAN), the method comprising:

setting, by a station (STA), a target wake time (TWT) element of a TWT request to indicate a suggested subchannel proposed by the STA as a temporary channel during a TWT service period (SP), wherein whether the suggested subchannel is in a first channel or a second channel depends on a channel puncturing pattern of a basic service set (BSS) with which the STA is associated;

sending, by the STA, the TWT request to an access point (AP) to establish an individual TWT agreement between the AP and the STA;

receiving, by the STA, a TWT response from the AP to establish the individual TWT agreement between the AP and the STA, wherein the TWT response comprises a TWT element which is set to indicate a selected subchannel provided to the STA as the temporary channel during the TWT SP, wherein whether the selected subchannel is in the first channel or the second channel depends on a channel puncturing pattern of the BSS with which the STA is associated, wherein the channel puncturing pattern is a puncturing pattern of a 320 MHz BSS, the first channel is a primary 160 MHz channel of the 320 MHz BSS, the second channel is a secondary 160 MHz channel of the 320 MHz BSS, and the channel puncturing pattern satisfies that the 320 MHz BSS comprises at least one of a punctured 40 MHz channel or a punctured 80 MHz channel, wherein whether the selected subchannel is in the first channel or the second channel depends on the channel puncturing pattern of the BSS with which the STA is associated comprises:

if the STA is a 160 MHz operating STA, the selected subchannel is in a channel not including a punctured channel or in a channel including the punctured 40 MHz channel; and operating, by the STA, at the provided selected subchannel as the temporary channel during the TWT SP.

15. The method according to claim 14, wherein a control field of the TWT element comprises a second subfield which is set to indicate whether the selected subchannel provided to the STA as the temporary channel during the TWT SP is in the primary 160 MHz channel or the secondary 160 MHz channel if a Broadcast field of the control field is set to indicate that information included in the TWT element is for negotiation of parameters of an individual TWT or a wake target beacon transmission time (TBTT) interval.

16. An access point (AP) for resource unit (RU) allocation in a wireless local area network (WLAN), wherein the AP comprises a memory to store instructions for performing a method for selective subchannel transmission (SST) operation in the WLAN, and a processor communicably coupled with the memory, the processor is configured to execute the instructions stored in the memory to perform the method for SST operation in the WLAN, and the method comprises:

receiving a target wake time (TWT) request from a station (STA) to establish an individual TWT agreement between the AP and the STA, wherein the TWT request comprises a TWT element which is set to indicate a suggested subchannel proposed by the STA as a temporary channel during a TWT service period (SP), wherein whether the suggested subchannel is in a first channel or a second channel depends on a channel puncturing pattern of a basic service set (BSS) with which the STA is associated;

setting a TWT element of a TWT response to indicate a selected subchannel provided to the STA as the temporary channel during the TWT SP, wherein whether the selected subchannel is in the first channel or the second channel depends on the channel puncturing pattern of the BSS with which the STA is associated, wherein the channel puncturing pattern is a puncturing pattern of a 320 MHz BSS, the first channel is a primary 160 MHz channel of the 320 MHz BSS, the second channel is a secondary 160 MHz channel of the 320 MHz BSS, and the channel puncturing pattern satisfies that the 320 MHz BSS comprises at least one of a punctured 40 MHz channel or a punctured 80 MHz channel, wherein whether the selected subchannel is in the first channel or the second channel depends on the channel puncturing pattern of the BSS with which the STA is associated comprises:

if the STA is a 160 MHz operating STA, the selected subchannel is in a channel not including a punctured channel or in a channel including the punctured 40 MHz channel; and sending the TWT response to the STA to establish the individual TWT agreement between the AP and the STA.

17. The AP according to claim 16, wherein an individual TWT parameter set field of the TWT element comprises two TWT channel fields, wherein one of the two TWT Channel fields is set to indicate the selected subchannel if the selected subchannel is in the primary 160 MHz channel and the other one of the two TWT channel fields is set to indicate the selected subchannel if the selected subchannel is in the secondary 160 MHz channel.

18. The AP according to claim 16, wherein in a case that the 320 MHz BSS includes the punctured 40 MHz channel or the punctured 80 MHz channel, the selected subchannel is in the channel not including the punctured channel.

19. The AP according to claim 16, wherein in a case that the 320 MHz BSS includes the punctured 40 MHz channel and the punctured 80 MHz channel, the selected subchannel is in the channel including the punctured 40 MHz channel.

* * * * *